Patented Aug. 28, 1934

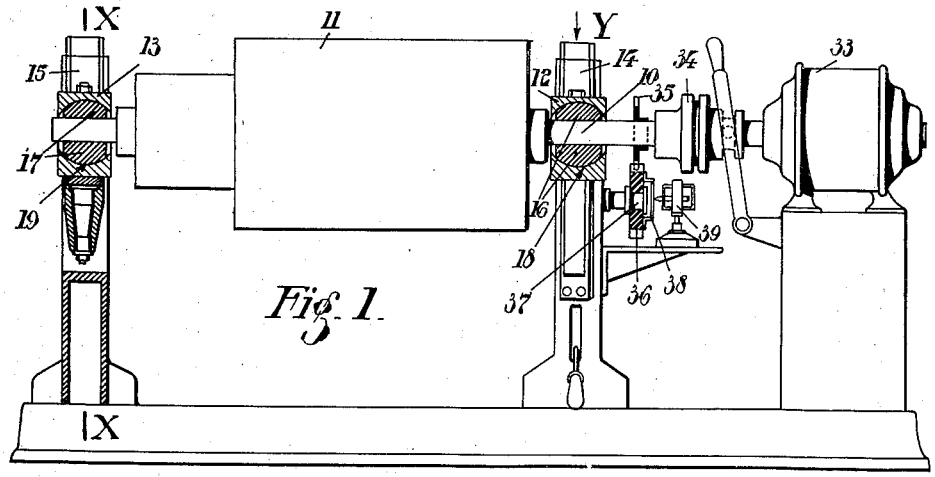
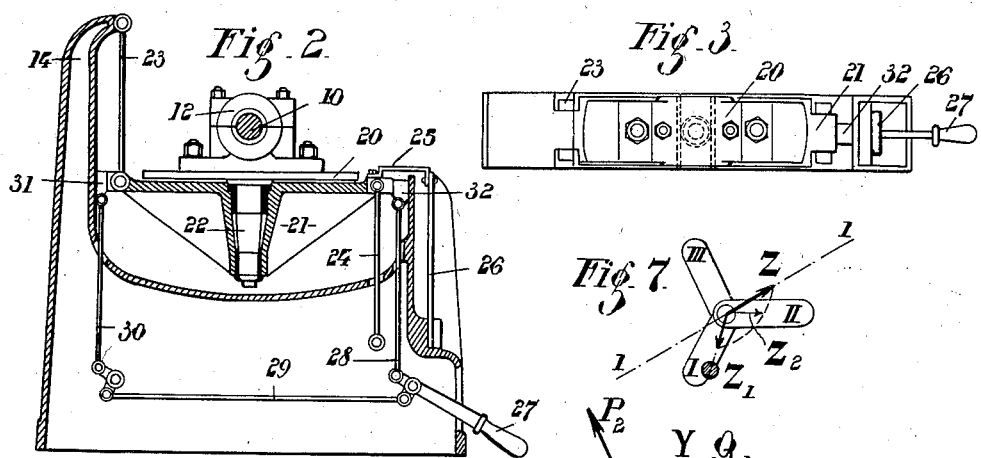
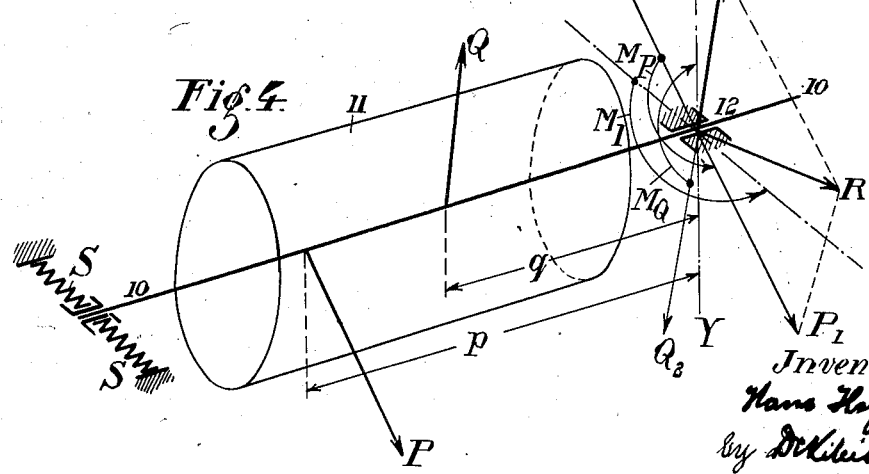

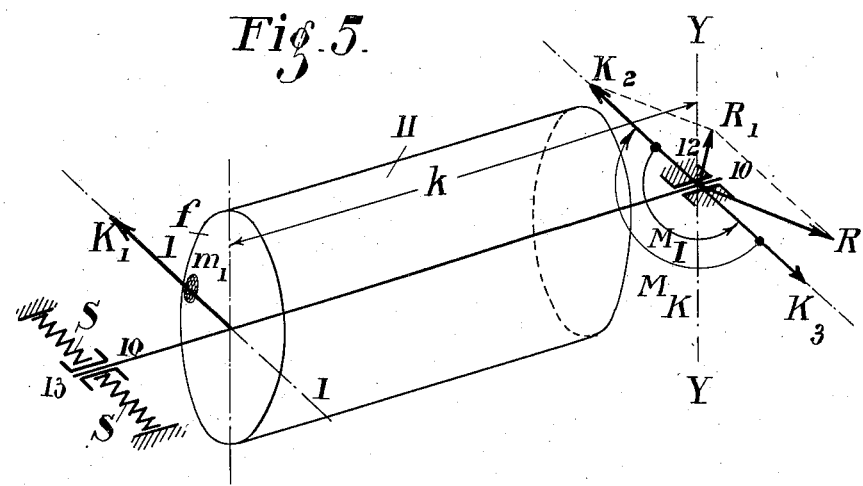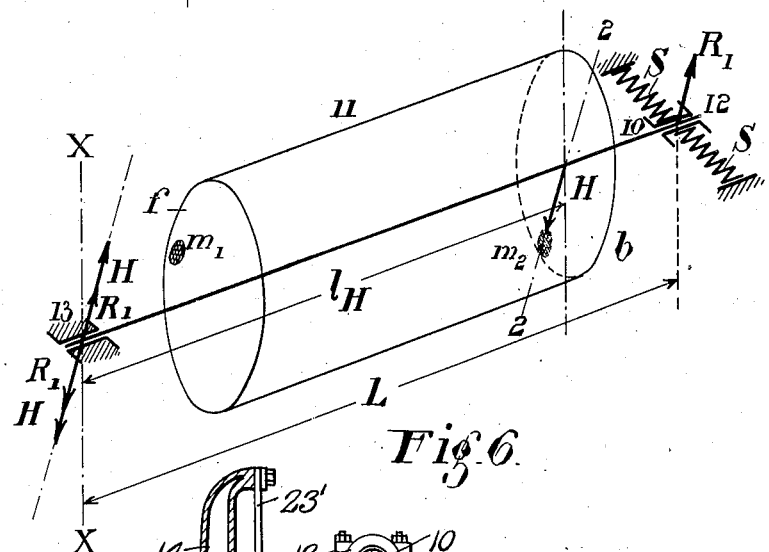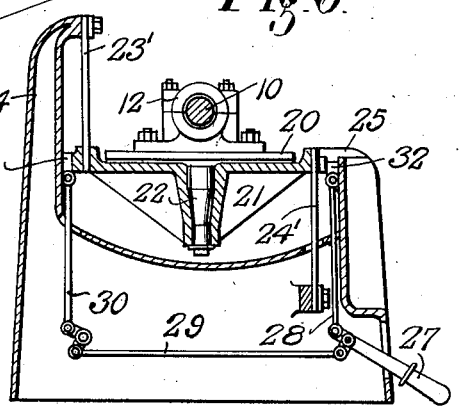

1,971,562

UNITED STATES PATENT OFFICE 1,971,562

DYNAMIC BALANCING OF ROTATING BODIES

Hans Heymann, Darmstadt, Germany, assignor to Carl Schenck, Eisen Giesserei und Maschinen Fabrik Darmstadt Gesellschaft mit beschrankter Haftung, Darmstadt, Germany, a corporation of Germany Application August 24, 1921, Serial No. 494,958 In Germany March 3, 1916

11 Claims. (Cl. 73—51)

(Granted under the provisions of the act of March 3, 1921, 41 Stat. L., 1313)

I have filed applications in Germany, March 3, 1916, Pat. No. 301,961, August 3, 1916, Pat. No. 302,061, November 30, 1918; December 21, 1916, Pat. No. 312,971, June 21, 1917, Pat. No. 304,064, July 6, 1916, Pat. No. 306,844, March 3, 1917, Pat. No. 307,375.

My invention relates to methods of and a device for the dynamic balancing of rotating bodies and more particularly to methods and devices which utilize the plane oscillations of the body to be balanced produced by the revolving masses.

Dynamic devices for and methods of balancing are old, in which the test body is made to consecutively perform oscillations in a plane about first one and then about another axis at right angles to its shaft. The oscillations are produced during the rotation of the body by the centrifugal forces caused by the unbalanced masses of the body. By these devices and methods it is possible to remove couples of unbalanced forces as well as single unbalanced forces. In these devices and methods the couples of forces are first balanced by additional masses, whereupon the single forces are determined by altering the balancing device according to one of the following principles:

(1) The test body is turned through an angle of 180°, that part of the shaft which until then was located in the oscillating or sliding bearing capable of moving to and fro, being mounted in the bearing containing the pendulum axis of rotation, and vice versa.

(2) The test body or the pendulum axis is displaced a predetermined distance.

These expedients, however, are often complicated and unsuitable, particularly when the test bodies are very heavy.

According to my invention, now, not only this drawback is overcome, but further advantages are achieved. In particular a simple method of balancing test bodies is provided by giving the axes, about which the test body is successively oscillated, a predetermined position in relation to the test body, for instance by placing said axes in or near the bearings in which the test body is to revolve in practical operation.

The method of balancing test bodies which may be carried out with the aid of the new device or by other means, consists in first providing the body with a single balancing weight which is attached in such a manner that a balancing moment is produced which is equal but opposed to the resulting moment of the unbalanced couple of forces and the single unbalanced force of the test body.

With this method, an unbalanced force will remain in the body, which can however be reduced to a minimum by repeatedly performing this method of approximation for determining the unbalances by displacing the oscillation axes. This method need be repeated only a few times, particularly so if the plane, in which the balancing masses are to be arranged, is at a short distance only from the bearings used as centres of oscillation.

In the drawings affixed to this specification and forming part thereof a device embodying my invention is illustrated diagrammatically by way of example and the method is further illustrated by diagrammatic views. In the drawings Fig. 1 is an elevation of my improved device, partly in section, Fig. 2 is a section of one of the bearings on line X—X of Fig. 1, Fig. 3 is a plan view of a part of my device viewed in the direction of arrow Y in Fig. 1, Figs. 4–6 are diagrammatic views illustrating my new method, Fig. 7 illustrates the application of my method to a shaft having a plurality of cranks, and Fig. 8 illustrates a modification of Fig. 2.

Referring to Fig. 1, the shaft 10 of the test body 11, is supported in bearings 12 and 13. It may be rotated by means of an electromotor 33 or other suitable means, through a coupling 34, which is preferably adapted to be disconnected. The bearings 12 and 13 are so arranged in uprights 14 and 15, respectively, that they can perform oscillations at right angles to shaft 10 against the action of springs. During this operation either the bearing 12 or the bearing 13 may be fixed in a manner which will be described later so as to render possible a rotation of the oscillating test body 11 about a fixed vertical axis, for example the axis X—X in Fig. 1.

A movement of the test body without jamming is, for example, achieved by forming the bearings 12 and 14 in several parts in such a manner, that the brasses 16 and 17 are capable of moving in relation to the bearings themselves. For this purpose the brasses are provided with spherical faces 18 and 19 which are supported in corresponding faces of bearings 12 or 13, respectively.

Preferably the device is provided with specially constructed supports for the bearings on which may be further secured the bearings in which the shaft is to revolve in practical operation. This is possible even in case that these bearings have no spherical faces (16 and 17, Fig. 1). These supports consist of two parts 20 and 21, (Fig. 2), the part 20 being mounted on a vertical journal 22 capable of rotating in relation to part 21, while part 21 is guided by two links 23 and 24 which are pivotally connected to the upright 14. As is well known, some point of the support will then move in a lemniscate, being guided in a practically straight line through the distance required for the oscillating motion of the test body. The links 23 and 24 may also be replaced by springs, preferably laminated springs 23', 24' (Fig. 8) each fixed at one of its ends, which tend to return the oscillating body into its central position. As shown in Fig. 2 part 21 of the support is acted upon by a laminated spring 26 through the medium of a resilient connecting piece 25.

The necessary alternating fixation of the centre of oscillation is effected by locking the sliding part 21. This can be effected by a system of levers and links 27, 28, 29 and 30 by means of which an intermediate piece 31 and a wedge 32 are inserted between the members 14 and 21 whereby the entire support is not only locked but also placed accurately in zero position.

The operation of this device is as follows:

The test body 11 is mounted in bearings of some kind, if desired, its own bearings, on the two parts 20 of the support and rotated by the motor 33 until its velocity exceeds the velocity of oscillations peculiar to the system. When starting, the portions 21 are locked on either side by the system of levers described. When the desired number of revolutions is attained, coupling 34 is disconnected and one of the two bearings of body 11, for instance bearing 12, is released, so that it oscillates about its zero position by means of links 23 and 24 under the action of laminated spring 26. During this operation the plane and the sense of rotation of the moment of unbalance in relation to the fixed axis of oscillation, in the case described about axis X—X, and the amount of the balance weight to be added or subtracted are determined. In order to be able to balance the unbalanced force which remains at the axis of oscillation X—X, the bearing 13 is now released so that it can perform oscillations, while the axis of oscillation is now placed into the upright 14 by fixing bearing 12. To the test body 11 is again imparted by means of motor 33 a velocity which exceeds the velocity of resonance, whereupon the motor is disconnected and the method is applied as before.

In this manner the necessary rotation of the bearing is separated from the sliding movement of the entire support 20, the sliding movement being disconnected as desired. It is immaterial in what succession the component parts of the support perform the revolving and sliding movements, this affecting only the construction of the support. The construction of the support should always be such that the component parts can be fixed for the sliding movement without effecting the component parts for the rotary movements, so that the rotary movements of the rotating shaft of the test body can be performed also about the fixed centre of oscillations without jamming. Preferably the bearings are so constructed that the bearing, apart from the sliding movements at right angles to the axis of the test body can also perform sliding movements in the direction of the axis of rotation of the test body, at least to a limited extent.

In order to be able to use a well known registering device arranged at the front face and for registering the oscillations and determining the plane of unbalance also at the side where the test body to be balanced is actuated, in which case it should require as little space as possible, and in order to be always able to actuate its oscillating portion, as far as possible, from the bearing which is moving to and fro, the device is preferably constructed, as illustrated in Fig. 1, as a diagram head connected with the revolving shaft and having the same number of revolutions and oscillations as the test body.

There is secured on the shaft 10 of the test body a light and narrow gear wheel 35 which actuates a somewhat wider gear wheel 36 having the same number of teeth and the same pitch. The driven wheel 36 is carried on a fixed arbor 37 which is secured to upright 14. On this gear wheel 36 which may have a greater or smaller diameter, as desired, there is mounted a diagram head 38 on which the indicator 39 projects the oscillations in a well known manner. In order to make the diagram head 38 more easily accessible, the diagram head can be arranged laterally of the shaft of the device, which also renders the diagram surface more visible. Preferably the oscillations for either direction of revolution are distinguished by using diagram strips of different colour or pencils of different colours.

Referring now to Fig. 4, the centrifugal forces produced by the unbalanced masses can be substituted by two forces P and Q extending in twisted relation with regard to one another. The amount, the direction and the points of engagement of these forces P and Q are not known when the balancing operation is started. The condition of the test body 11 is not altered if in one of the bearings, for instance bearing 12, forces P and Q are put down in equal and opposite direction at the point of intersection of the axis of rotation 10—10 with the axis of oscillation Y—Y (see $P_1$, $Q_1$ and $P_2$, $Q_2$).

In the bearing point 12 the forces $P_1$ and $Q_1$ may be combined into a resultant R while the forces P and $P_2$ form a couple $M_p$ to which appertains the lever arm $p$. This couple $M_p$ is indicated in the plane of the couple by the arrow $M_p$ in point 12. Similarly the couple Q, $Q_2$ with the lever arm $q$ is indicated by an arrow $M_q$ at the bearing 12. The two couples of force MP and MQ can be combined in a known manner to a couple $M_1$ which, as a rule, will not be located in the same plane as the resulting force R. The force R and the resulting couple $M_1$ are therefore equal to the forces P and Q originally put down and may be substituted for them, (Fig. 5). The couple $M_1$, if the body 11 is supported as illustrated, produces the oscillations, while the force R only exerts pressure on bearing 12.

By means of any known registering device the plane in which the couple $M_1$ lies, can be determined comparatively easily. Let us assume this to be an axial plane which intersects the radial plane of body 11 in which the balancing masses must be arranged, for instance the front face $f$ of body 11, in a line 1—1 (Fig. 5). According to my invention, now, I no longer secure on the body 11, which is to be balanced, two masses in several radial planes, which form a couple equal to the couple $M_1$ but opposed to it, but, instead, I use only a single balancing mass $m_1$. The mass $m_1$ is made so large, that the oscillations of the body 11 about the axis of oscillation Y—Y cease. The centrifugal force $K_1$ produced by the mass $m_1$ can again be put down at the bearing point 12 in equal and opposite direction ($K_2$, $K_3$ in Fig. 5). The forces $K_1$ and $K_3$ will then form with its arm $k$ a turning movement which is equal but opposed to couple $M_1$. As the moments $M_1$ and $MK$ are balanced, only two forces $R$ and $K_2$ will remain at the bearing point 12, which may be combined to form a new resultant $R_1$.

If, as will generally be the case, the radial plane $F$ extends near bearing 13, the resulting force $R_1$ which remains over after the first balancing, will be considerably smaller than the force $R$ resulting originally from the forces $P$ and $Q$. In order to remove this remaining force $R_1$, the axis of oscillations $Y$—$Y$ is displaced from bearing 12 to bearing 13 (Fig. 6) while the damping springs are acting on bearing 12. The remaining force $R_1$ now has a lever $L$ in relation to the new axis of oscillation $X$—$X$ in bearing 13. The axial plane in which the remaining force $R_1$ is acting, is again determined by means of well known registering devices. The point at which the force $R_1$ acts, that is, the point of bearing 12 in which the axes 10—10 and $Y$—$Y$ intersected at the first balancing, is known. If it were possible to provide at this point a balancing mass, which would produce a centrifugal force equal but opposed to $R_1$, the body would be perfectly balanced. This is not possible but as the balancing mass $m_2$ extends in a direction 2—2, an error is introduced, which however is small. The direction 2—2 is that in which the axial plane laid through force $R_1$ intersects the radial plane $b$ at the rear of body 11 which is provided for taking up the balancing mass. The oscillations produced by the remaining force $R_1$ will disappear at a certain value of the additional masses $m_2$, that is in the case where the centrifugal force $H$ of the mass, multiplied with its lever arm $LH$, is equal to the remaining force $R_1$ multiplied with its lever arm $L$. In this case a remaining force $R_2$ remains in the bearing 13 which is equal to $H$ minus $R_1$. We may assume equal and opposed forces $R_1$ and $H$ at bearing 13 as explained above in relation to bearing 12. Obviously this force $R_2$ is again considerably smaller than the force $R_1$.

Now the axis of oscillations may again be placed into bearing 12 and the balancing be repeated. By providing a new balancing mass $m_3$, not shown, in the radial plane $f$, a remaining force is produced at bearing 12, which is again considerably smaller than the remaining force $R_2$. Obviously three or at the utmost four balancing operations will suffice.

The balancing method described is very favourable for instance for the balancing of crank shafts having several cranks extending in various planes, especially as the points, where the balancing masses must be provided, for instance the crank webs, are in immediate vicinity of bearings 12 or 13, respectively.

When balancing bodies, particularly crank shafts, the difficulty is sometimes met in that the balancing masses $m$ would have to be arranged at points such as $Z$ (Fig. 7), where there is no material at all. This may occur if the axial plane of the remaining forces $R$, for instance the plane 1—1 intersects the body in an unfavourable manner. In such cases the balancing mass may be shifted to a more favourable point, for instance the crank II (Fig. 7), by providing an artificial unbalanced mass $Z_1$ at the crank I and altering the weight of this mass until the plane of the resulting moment from masses $Z$ and $Z_1$ is in the desired position, for example $Z_2$ in the direction of crank II.

The single steps combining to form my invention may be utilized singly as well as in groups or all together. My invention is by no means limited to the examples described and diagrammatically illustrated but comprises any modifications which are within the scope of the claims.

I claim:—

1. Balancing machine for bodies capable of being rotated comprising two bearings capable of oscillating bodily, and means pivotally supporting each bearing for oscillating motion about a single axis extending perpendicularly to its own axis.

2. A balancing machine for bodies capable of being rotated, comprising two pairs of substantially vertical rock arms, each rock arm being capable of rocking about one end, two bearings respectively supported by the other ends of a corresponding pair of rock arms whereby one bearing is capable of rocking about the other bearing, and separate means for locking each bearing against rocking motion.

3. Balancing machine for bodies capable of being rotated comprising four leaf springs, each fixed at one end, two bearings, each of these bearings being supported by the other ends of two springs and capable of moving angularly about a vertical axis and of oscillating about the other bearing and separate means for preventing each bearing from oscillating.

4. Balancing machine for bodies capable of being rotated comprising a support, two spherical bearings on said support disposed in axial alignment, two substantially horizontal plates, each carrying one of said bearings and being capable of rocking bodily in substantially horizontal direction at right angles to the axis of said bearing, and separate means for locking each plate against rocking motion.

5. Balancing machine comprising two bearings adapted for rotatably supporting a test body mounted between them and two movable journals capable of shifting bodily in a vertical plane, one adjoining each end of said test body, each journal supporting one of said bearings, means for supporting each journal for bodily rocking movement in the plane of its own axis, the axes of said journals extending substantially at right angles to the bearing axes and means for alternately locking each journal against rocking motion.

6. A balancing machine which comprises two bearings capable of oscillating bodily, said bearings being adapted for the mounting of a test body and being located at axially spaced points on opposite sides of said body, means pivotally supporting one of said bearings to hold the same in a fixed position and to permit the test body to oscillate about an axis of oscillation, and means for resiliently mounting said other bearing and for restricting the oscillating motion to a single plane substantially perpendicular to the axis of rotation of the test body.

7. A balancing machine which comprises two bearings capable of oscillating bodily, said bearings being adapted for the mounting of a test body and being located at axially spaced points at the opposite ends of said test body, means pivotally supporting one of said bearings to hold the same in a fixed position and to permit the test body to oscillate about an axis of oscillation, second means for mounting said second bearing and capable of movement, and resilient means for supporting said second means and for restricting the oscillating motion to a single plane substantially perpendicular to the axis of rotation of the test body.

8. A balancing machine which comprises two bearings capable of oscillating bodily, said bearings being adapted for the mounting of a test body and being located at axially spaced points at the opposite ends of said test body, means pivotally supporting one of said bearings to hold the same in a fixed position and to permit the test body to oscillate about an axis of oscillation, and means for resiliently mounting said other bearing and for restricting the oscillating motion to a single plane substantially perpendicular to the axis of rotation of the test body, and an indicating means for indicating the extent of the oscillations.

9. A balancing machine which comprises two bearings capable of oscillating bodily, said bearings being adapted for the mounting of a test body and being located at axially spaced points on opposite sides of said body, means pivotally supporting one of said bearings to hold the same in a fixed position and to permit the test body to oscillate about an axis of oscillation, and means for resiliently mounting said other bearing for restricting the oscillating motion to a single plane substantially perpendicular to the axis of rotation of the test body, a motor for rotating the test body in said bearings, and means for disconnecting said motor from the test body.

10. A balancing machine which comprises two bearings capable of oscillating bodily, said bearings being adapted for the mounting of a test body and being located at axially spaced points on opposite sides of said body, means pivotally supporting one of said bearings to hold the same in a fixed position and to permit the test body to oscillate about an axis of oscillation, and means for resiliently mounting said other bearing for restricting the oscillating motion to a single plane substantially perpendicular to the axis of rotation of the test body, and an indicating means operatively associated with one of said bearings for indicating the oscillating motion.

11. The method of balancing a rotative test body which comprises rotatably mounting a test body in two supports capable of bodily oscillation, fixing said supports, rotating said body to exceed the velocity of resonance, freeing one of said supports so that the body can pivot about the fixed support and can oscillate in a single plane substantially perpendicular to the axis of rotation, permitting said rotating body to slow down while indicating the oscillations occurring during the resonance period, applying a correction to said body, fixing said freed support, rotating said body again to exceed the velocity of resonance, freeing the other support so that the body can pivot about the fixed support and can oscillate in a single plane substantially perpendicular to the axis of rotation, permitting said rotating body to slow down while indicating the oscillations occurring during the resonance period, and applying another correction to said body to balance the unbalance therein.

HANS HEYMANN.